(No Model.)
M. O. BALDWIN.
CAR AXLE.
No. 275,323. Patented Apr. 3, 1883.
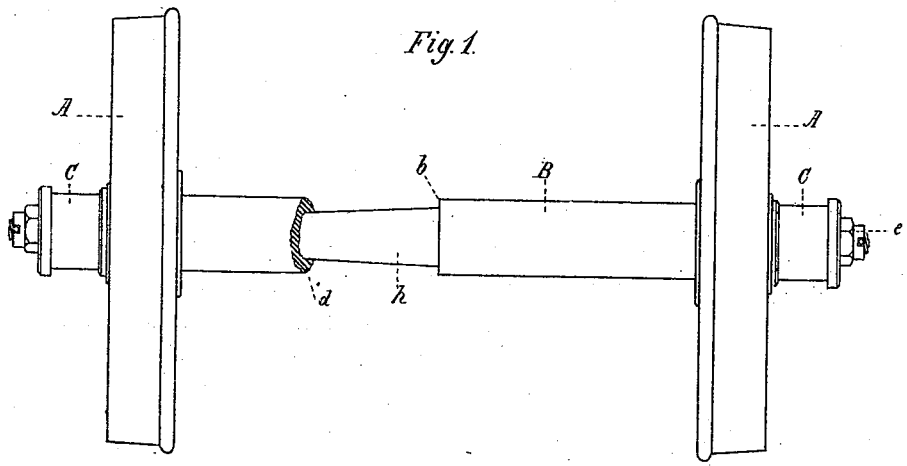
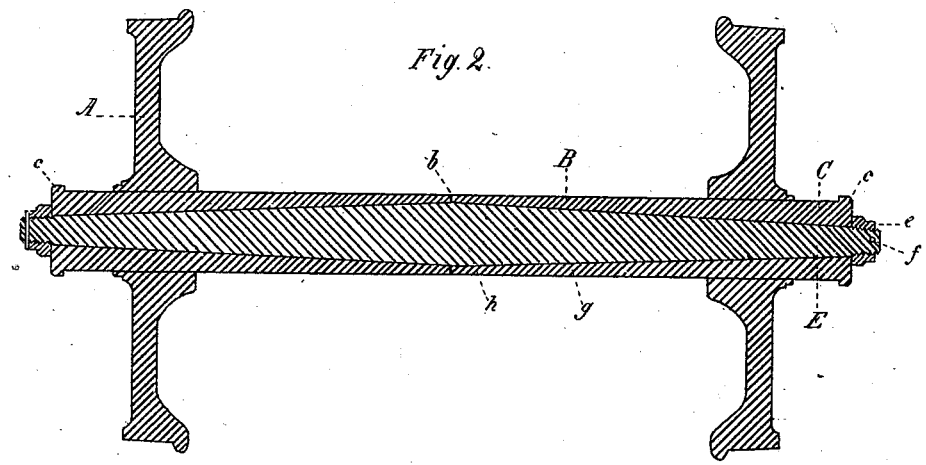
Witnesses:
Inventor
Marcellus O. Baldwin, M. D.

UNITED STATES PATENT OFFICE.

MARCELLUS O. BALDWIN, OF KANSAS CITY, MISSOURI, ASSIGNOR OF ONE-HALF TO H. A. DORR, OF SAME PLACE.

CAR-AXLE.

SPECIFICATION forming part of Letters Patent No. 275,323, dated April 3, 1883.

Application filed December 4, 1882. (No model.)

*To all whom it may concern:*

Be it known that I, MARCELLUS O. BALDWIN, of Kansas City, in the county of Jackson and State of Missouri, have invented certain new and useful Improvements in Duplex Car-Axles; and I do hereby declare that the following is a full, clear, and exact description thereof, which will enable others skilled in the art to make and use the same, reference being had to the accompanying drawings, forming a part of this specification.

My invention has for its object the construction of a duplex sectional safety-axle which will permit the independent rotation of its several parts in the curves of a track without friction or oblique impingement upon its bearings, with greater capacity for resisting vertical or torsional strains, and which will afford safety in fracture of the axle and be self-lubricating; and it consists, first, in the inner construction of the sleeve for self-lubricating the contiguous frictional surfaces of the sleeve and core of the axle; second, in the construction of the independent core of the axle for giving increased safety in fractures of the same and protection from vertical and torsional strains.

In the drawings, Figure 1 is a front longitudinal elevation of the axle and wheels attached, with a portion removed from the sleeve at $d$ to show construction. Fig. 2 is a longitudinal sectional elevation of the wheels and axle.

A A represent opposite car-wheels, of ordinary construction.

B represents the axle, having sectional sleeve $g$ and core $h$.

C represents the journal, and $c$ the collar upon the same.

E represents the core of the journal, having nuts $e$ and pin $f$ for securing the sleeve of the axle on the core.

In the construction of my invention I form from any suitable metal a longitudinal hollow sectional cylinder or sleeve, $g$, forming the outer portion of the axle, extending from its extremities to $b$, its center. The outer circumference of the sleeve $g$ is of the same relative proportion, the inner circumference, however, of each section of the sleeve being conical in shape, extending to its extremities, and adapted to receive the core $h$ of the axle B. The core $h$ of the axle I construct in one solid piece, tapering from the center toward its extremities, and arranged to fit independently within the hollow sleeve $g$. The outer extremities, C, of the sleeve $g$, together with the extremities E of the core $h$, constitute the journal. A collar, $c$, is formed upon the outer extremity of the journal, preventing the journal-boxes from lateral play. The extremities of the core of the axle $h$ are threaded to receive a nut, $e$, through which and at right angles to the same a pin, $f$, passes, thereby preventing the removal of the nut until the pin is removed. The wheel is then rigidly attached to the sleeve $g$ in the ordinary manner.

In the operation of my duplex safety-axle the sections of the sleeve to which the wheels are attached are severally placed over the core, each section being gaged to fit and act independently thereon. This arrangement, permitting the independent acceleration of one section of the sleeve of the axle over that of the other, does away with the torsional strain upon the sleeves.

Upon obliquely-inclined grades the portions of the axle to which the lower wheel is attached is subjected to the greatest amount of strain, and in my invention the sleeve and core mutually re-enforce each other, and in that manner relieving the strain upon either portion. I am also enabled to prevent oblique impingement of the frictional surfaces between the wheel and axle, which occur in short bearings, and to strengthen the inner core of the axle at the divided point of the sleeve.

My invention also has the advantage of being self-lubricating, and in the formation of the sleeve of the axle I am enabled to lubricate every frictional bearing around the core. The extremities of each axle being immersed in the oil-box, the oil is fed therefrom and passes along the incline of the inner surface of the sleeve from each box.

In the common form of single axle fractures usually occur near the wheel. In the compound axle, with the journals as now constructed, the re-enforcing of the axle at this point lessens much of the danger and throws the strain upon the center of the inner or continuous axle, to counteract which my axle is peculiarly adapted, the frictional surfaces being arranged to wear equally and the accumulations therefrom unconfined. In making the core of the axle of increased thickness at its center or at the divided point of the sleeve, I am enabled to reenforce the sleeve and give increased strength to the axle. The independent arrangement of the core within the journal enables the core to revolve in union, but in the curves of the track at variable relations with the journal, and a minimum amount of friction is produced.

The results of my invention contribute a simple and more economical axle for long and serviceable wear at reduced expense in the application and cost of propulsion. Its adaptation is not confined to car-wheels, but may be applied to all classes of vehicles.

Having fully described my invention, what I claim as new, and desire to secure by Letters Patent, is—

1. A compound axle composed of two independently-rotating parts, one of said parts being centrally divided, and forming an exterior hollow sleeve rigidly extending to and making the journals of the said axle, and having its interior surface constructed to taper from the center of the axle to its extremities, for the purpose described.

2. A compound axle composed of two independently-rotating parts, one of said parts being constructed in one piece and forming an independent central core to an outer sleeve and the journals of said sleeve, and constructed to taper from the center to the extremities of the axle, for the purpose described.

MARCELLUS O. BALDWIN.

Witnesses:
L. B. BAILEY,
GEO. R. THOMPSON.